United States Patent [19]

Armbruster et al.

[11] Patent Number: 4,894,431
[45] Date of Patent: Jan. 16, 1990

[54] ACCELERATED CURING SYSTEMS FOR EPOXY RESINS

[75] Inventors: Robert F. Armbruster, Okemos; Rajan Eadara, East Lansing; William L. Miller, Okemos, all of Mich.

[73] Assignee: Ciba-Geigy Corporation, Ardsley, N.Y.

[21] Appl. No.: 197,479

[22] Filed: May 23, 1988

[51] Int. Cl.$^4$ ............................................... C08G 59/68
[52] U.S. Cl. .................... 528/90; 525/504; 252/182.17; 528/98; 528/109; 528/391; 528/407
[58] Field of Search ............... 528/90, 109, 391, 98, 528/407; 252/182.17; 525/504

[56] References Cited

U.S. PATENT DOCUMENTS

| 3,666,721 | 5/1972 | Godfrey | 528/90 |
| 3,785,997 | 1/1974 | Godfrey | 528/90 X |
| 4,101,459 | 7/1978 | Andrews | 528/90 |
| 4,307,208 | 12/1981 | Chattha | 528/90 X |
| 4,323,660 | 4/1982 | Chattha | 528/90 X |

*Primary Examiner*—Earl Nielsen
*Attorney, Agent, or Firm*—Harry Falber

[57] ABSTRACT

Curing systems for epoxy resins comprising an aliphatic or cycloaliphatic amine in combination with anhydrous methane sulfonic acid as an accelerator for the curing reaction.

14 Claims, No Drawings

ACCELERATED CURING SYSTEMS FOR EPOXY RESINS

A wide variety of primary and secondary amines have long been used in industry as curing agents for epoxy resins. The identity of many of these amines and their curing mechanisms are discussed in Lee and Neville, Handbook of Epoxy Resins, McGraw-Hill (1982). In addition, accelerators are frequently used in conjunction with the curing agents to promote the cure within reasonable periods of time based on use and storage parameters. Typical accelerators include various tertiary amines, phenols, alcohols, aromatic acids and semi-inorganic-derived accelerators such as triphenyl phosphite and p-toluene sulfonic acid. Such accelerators are likewise discussed in Lee and Neville.

p-Toluene sulfonic acid is a frequently utilized accelerator. It has been noted, however, that it tends to absorb moisture and harden upon prolonged storage, thereby requiring additional treatment prior to use, and is difficult to handle in cold environments. Larger amounts of the acid are also required in order to attain the desired acid strength.

Accordingly, it is the primary object of the invention to provide accelerated curing systems for epoxy resins.

It is a further object to provide such curing systems which overcome the disadvantages of prior art systems, particularly in terms of the contribution of the accelerating component of the systems.

Further objects and advantages of the invention will become apparent from the following descriptions thereof.

It has now been surprisingly discovered that by utilizing anhydrous methane sulfonic acid as the accelerator component in combination with aliphatic and cycloaliphatic amines to form curing systems for epoxy resins, enhanced performance characteristics are obtained. Thus, the presence of the methane sulfonic acid significantly reduces gel times of various epoxy resins, particularly low viscosity epoxy resins. It is a homogeneous liquid at room temperature and can be easily handled without preheating or mixing. Its low freezing point (19° C.) facilitates easy handling in cold environments. It blends readily with amine curing agents eliminating the water removal and filtration steps required with other accelerators, e.g. p-toluene sulfonic acid. Smaller amounts of the acid relative to p-toluene sulfonic acid are required in order to attain the same acid strength. Furthermore, the curing system of the invention is applicable for use with a wide variety of epoxy resins to be utilized in a wide variety of end use applications.

As suitable amines for use in combination with the anhydrous methane sulfonic acid, there may be mentioned aliphatic or cycloaliphatic primary and secondary amines, including mixtures. Typical amines include monoethanolamine, N-aminoethyl ethanolamine, ethylenediamine, hexamethylenediamine, trimethylhexamethylenediamine, methylpentamethylenediamine, diethylenetriamine, triethylenetetramine, tetraethylenepentamine, N,N-dimethylpropylenediamine-1,3, N,N-diethylpropylenediamine-1,3, bis(4-amino-3-methylcyclohexyl)methane, bis(p-aminocyclohexyl)methane, 2,2-bis-(4-aminocyclohexyl)propane, 3,5,5-trimethyl-s-(aminomethyl)cyclohexylamine, 1,2-diaminocyclohexane, 1,4-diaminocyclohexane, 1,3-bis(aminomethyl)cyclohexane, 1,4-bis(aminomethyl)cyclohexane, N-aminoethylpiperazine and isophorone diamine. Preferred amines include 2,2,4-trimethylhexamethylenediamine, 2,4,4-trimethylhexamethylenediamine, 2-methylpentamethylenediamine, diethylenetriamine, triethylenetetramine, tetraethylenepentamine, 1,2-diaminocyclohexane, bis(p-aminocyclohexyl)methane, isophorone diamine, 1,4-bis(aminomethyl)cyclohexane, N-aminoethylpiperazine and 1,3-bis(aminomethyl)cyclohexane.

The amines and the methane sulfonic acid are utilized in the curing system in weight ratios ranging from 99:1 to 90:10 and preferably from 99:1 to 95:5. The respective materials are generaly mixed at room temperature, optionally dried under vacuum, and then stored in dry, closed containers. Any exotherm resulting from the combination should be controlled with cooling such that the temperature does not exceed about 50° C. The blends are liquid at room temperature with low viscosity.

As previously noted, the modified curing systems can be processed with a wide variety of epoxy resins. Included among such resins are epoxide resins based on polyhydric phenols such as those based on bisphenol A, F and S, epoxidation products of cresol novolacs, and epoxidation products of phenol novolacs; hydantoin epoxide resins; polyglycidyl esters; glycidylated aromatic amines; glycidylated aminophenols; and certain cycloaliphatic epoxy resins. More specifically, typical materials include diglycidyl ether of bisphenol A, epoxy phenol novolacs, 1,4-butane diol diglycidyl ether, epoxy cresol novolacs, triglycidyl para-amino phenol, triglycidyl tris(p-hydroxyphenyl)methane, tetraglycidyl-1,1,2,2 tetrakis (p-hydroxyphenyl)ethane, vinyl cyclohexane dioxide, N,N,N',N'-tetraglycidyl-4,4'-methylene bis-benzeneamine, N,N,N',N'-tetraglycidyl meta-xylene diamine, diglycidyl aniline, resorcinol diglycidyl ether, the diglycidyl ethers of catechol, hydroquinone, and the like, diglycidyl ortho-toluidine, diglycidyl isophthalate, bisphenol F and S epoxy resins, and N,N,N',N'-tetraglycidyl-1,3-bis-aminomethylcyclohexane. The various ethers may be substituted on the respective phenyl rings by such non-reactive substituents as alkyl, halogen, and the like. The epoxy resins may also be modified with reactable solvents such as methanol and isopropanol. In adhesive and coating applications, resin based on the diglycidyl ether of bisphenol A is widely used. The modified curing system is utilized in stoichiometric amounts ±50% relative to the epoxy resin, with 85% of stoichiometry being preferred.

Apart from the above areas of utility, the systems of this invention are useful as curing agents for a wide variety of epoxy resins in various heat cured applications. When combined with di- and polyepoxides, at the indicated stoichiometric amounts, and cured at elevated temperatures, a network of high crosslink density occurs. Accordingly, the expression "cure" as used herein, denotes the conversion of the above epoxide material into insoluble and infusible crosslinked products, with simultaneous shaping to give shaped articles such as castings, pressings or laminates, or to give two-dimensional structures such as coatings, enamels or adhesive bonds. The modified curing system is particularly advantageous for the formation of crack filling materials for use in concrete structures and for bonding concrete. It is to be noted that gel times indicative of cure speed tend to range from 10 to 60 minutes at 25° C., depending on the specific additives.

The curable epoxy resin systems can furthermore be mixed, at any stage before cure, with usual modifiers such as extenders, fillers and reinforcing agents, pigments, dyestuffs, organic solvents, plasticizers, tackifiers, rubbers, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, talc, silica aerogel("Aerosil"), lithopone, barite, calcium carbonate, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyral, waxes, stearates and the like (which are in part also used as mold release agents) to the curable mixtures.

The solvents modify the curable blends, particularly serving to control viscosity. Applicable solvents include ether alcohols such as ethylene glycol monomethylether, mono-ethylether, monobutylether, and the diethylene glycol analogs; aromatic hydrocarbons such as xylene and toluene; and the like.

The curable mixtures can be manufactured in the usual manner with the aid of known mixing equipment (stirrers, kneaders, rollers and the like).

The curable epoxide resin mixtures are especially useful in the fields of surface protection, the electrical industry, laminating processes and the building industry. They can be used in a formulation which is in each case suited to the particular end use, in the unfilled or filled state, optionally in the form of solutions or emulsions, as paints enamels, sintering powders, compression molding compositions, dipping resins, casting resins, injection molding formulations, impregnating resins and adhesives, as tooling resins, laminating resins, sealing and filling compositions, floor covering compositions and binders for mineral aggregates.

The following examples will further illustrate the embodiments of the instant invention. In these examples, all parts are given by weight unless otherwise noted.

EXAMPLE 1

This example illustrates the preparation of a typical curable epoxy system of the instant invention.

Resin: diglycidyl ether of bisphenol A with a functional diluent (ARALDITE EP-IS from CIBA-GEIGY Corp.—Brookfield Viscosity at room temperature, spindle #1, 20 rpm—200-300 cps.)

| Curing System | parts, by weight | | | | | |
|---|---|---|---|---|---|---|
| | C-1 | C-2 | C-3 | C-4 | C-5 | C-6 |
| Trimethylhexamethylene-diamine | 100 | 99 | 98 | 96 | 95 | 90 |
| Anhydrous methane sulfonic acid | — | 1 | 2 | 4 | 5 | 10 |

Curing System Preparation:

Procedure 1: The components are mixed at room temperature in the proportions given in the table and are stored immediately in dry, closed containers. Precaution is taken to cool the mixture to control the exotherm, such that the temperature does not exceed 50° C.

Procedure 2: The components are mixed at room temperature in the proportions given in the table, are dried under vacuum @ 50°-60° C. for 1 hr. and are stored in dry, closed containers.

Procedure 3: The systems prepared in Procedure 1 are exposed to air for 3 hours and are stored in dry, closed containers.

Epoxy Resin Preparation and Evaluation:

The epoxy resin and the curing system are mixed at room temperature at a weight ratio of 100 parts resin to 30 parts curing system. The curable mix is then inserted as a 130 part mass into a Tecam gel timer which functions with an oscillating rigid probe in the test material. The probe and timer stop automatically as the epoxy hardens. The time noted is "gel time".

The following results are obtained.

| Curing System | Gel time (in minutes) | | |
|---|---|---|---|
| | Procedure 1 | Procedure 2 | Procedure 3 |
| C-1 | 80.0 | 80.0 | 80.0 |
| C-2 | 38.2 | 37.4 | 34.4 |
| C-3 | 26.0 | 26.8 | 24.7 |
| C-4 | 19.0 | 19.0 | 18.9 |
| C-5 | 16.0 | 16.0 | 17.3 |
| C-6 | 11.0 | 10.4 | 12.4 |

The data indicates the accelerated curing to form the three-dimensional crosslinked network indicative of a thermoset.

EXAMPLE 2

The procedures of Example 1 are repeated with the exception that 2-methylpentamethylenediamine is utilized as the curing system amine, preparative procedure 1 is utilized and the resin and curing system are mixed in a weight ratio of 100 parts resin to 20 parts curing system. C-7 to C-12 reflect the same amine acid concentrations utilizing the indicated replacement amine.

The results are as follows:

| Curing System | Gel Time (Min.) |
|---|---|
| C-7 | 65.2 |
| C-8 | 38.6 |
| C-9 | 28.5 |
| C-10 | 20.6 |
| C-11 | 17.5 |
| C-12 | 12.9 |

Summarizing, it is seen that this invention provides improved curing systems for epoxy resins. Variations may be made in procedures, proportions and materials without departing from the scope of the invention as defined by the following claims.

What is claimed is:

1. A curing system for epoxy resins comprising anhydrous methane sulfonic acid and at least one aliphatic or cycloaliphatic primary or secondary amine, said acid and said amine being present in a weight ratio of 1:99–10:90.

2. The system of claim 1, wherein said weight ratio is 1:99–5:95.

3. The system of claim 1, wherein said amine is selected from the group consisting of monoethanolamine, N-aminoethyl ethanolamine, ethylenediamine, hexamethylenediamine, trimethylhexamethylenediamine, methylpentamethylenediamine, diethylenetriamine, triethylenetetramine, tetraethylenepentamine, N,N-dimethylpropylenediamine-1,3, N,N-diethylpropylenediamine-1,3, bis(4-amino-3-methylcyclohexyl)methane, bis(p-aminocyclohexyl)methane, 2,2-bis-(4-aminocyclohexyl)propane, 3,5,5-trimethyl-s-(aminomethyl)cyclohexylamine, 1,2-diaminocyclohexane, 1,4-diaminocyclohexane, 1,3-bis(aminomethyl)cyclohexane, 1,4-bis(aminomethyl)cyclohexane and isophorone diamine.

4. The system of claim 3, wherein said amine is 2,2,4-trimethylhexamethylenediamine, 2,4,4-trimethylhexamethylenediamine or 2-methylpentamethylenediamine.

5. A curable mixture comprising a polyepoxide compound and a curing system according to claim 1.

6. The curable mixture of claim 5, wherein said polyepoxide compound is selected from the group consisting of epoxide resins based on polyhydric phenols, epoxidation products of cresol novolacs, epoxidation products of phenol novolacs, hydantoin epoxide resins, polyglycidyl esters, glycidylated aromatic amines, glycidylated aminophenols and cycloaliphatic epoxy resins.

7. The curable mixture of claim 6, wherein said polyepoxide compound is the diglycidyl ether of bisphenol A.

8. The curable mixture of claim 5, wherein said polyepoxide compound contains a reactable diluent.

9. The curable mixture of claim 5, wherein said amine is selected from the group consisting of monoethanolamine, N-aminoethyl ethanolamine, ethylenediamine, hexamethylenediamine, trimethylhexamethylenediamine, methylpentamethylenediamine, diethylenetriamine, triethylenetetramine, tetraethylenepentamine, N,N-dimethylpropylenediamine-1,3, N,N-diethylpropylenediamine-1,3, bis(4-amino-3-methylcyclohexyl)methane, bis(p-aminocyclohexyl)methane, 2,2-bis-(4-aminocyclohexyl)propane, 3,5,5-trimethyl-s-(aminomethyl)cyclohexylamine, 1,2-diaminocyclohexane, 1,4-diaminocyclohexane, 1,3-bis(aminomethyl)cyclohexane, 1,4-bis(aminomethyl)cyclohexane and isophorone diamine.

10. The curable mixture of claim 9, wherein said amine is 2,2,4-trimethylhexamethylenediamine, 2,4,4-trimethylhexamethylenediamine or 2-methylpentamethylenediamine.

11. The curable mixture of claim 5, wherein said curing system and said polyepoxide compound are present in stoichiometric amounts ±50%.

12. The curable mixture of claim 5, wherein said acid:amine ratio is 1:99–5:95.

13. The product obtained by curing the mixture of claim 5 at elevated temperatures.

14. The product obtained by curing the mixture of claim 12 at elevated temperatures.

* * * * *